United States Patent
Park et al.

(10) Patent No.: US 9,159,961 B2
(45) Date of Patent: Oct. 13, 2015

(54) CASE OF SECONDARY BATTERY INCLUDING A BEAD

(75) Inventors: Sung-Ho Park, Yongin-si (KR);
Man-Soo Shin, Yongin-si (KR);
Jong-Hoon Lim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 557 days.

(21) Appl. No.: 12/805,941

(22) Filed: Aug. 25, 2010

(65) Prior Publication Data
US 2011/0171522 A1   Jul. 14, 2011

Related U.S. Application Data

(60) Provisional application No. 61/282,279, filed on Jan. 13, 2010.

(51) Int. Cl.
| H01M 2/02 | (2006.01) |
| H01M 10/38 | (2006.01) |
| H01M 2/12 | (2006.01) |
| H01M 10/052 | (2010.01) |

(52) U.S. Cl.
CPC .......... *H01M 2/0207* (2013.01); *H01M 2/0237* (2013.01); *H01M 2/0217* (2013.01); *H01M 2/12* (2013.01); *H01M 10/052* (2013.01); *Y02T 10/7011* (2013.01); *Y10T 29/49108* (2015.01)

(58) Field of Classification Search
CPC ............ H01M 2/0207; H01M 2/0237; H01M 2/0217; H01M 10/052
USPC .......................................... 429/176; 29/623.1
See application file for complete search history.

(56) References Cited

U.S. PATENT DOCUMENTS

| 6,033,800 | A | * | 3/2000 | Ichiyanagi et al. | 429/176 |
| 6,630,270 | B1 | * | 10/2003 | Kim et al. | 429/94 |
| 2004/0137321 | A1 | | 7/2004 | Savaria et al. | |
| 2005/0029985 | A1 | | 2/2005 | Hano et al. | |
| 2005/0196663 | A1 | * | 9/2005 | Takamura et al. | 429/86 |
| 2006/0051666 | A1 | * | 3/2006 | Kim | 429/184 |
| 2008/0102364 | A1 | | 5/2008 | Uh et al. | |

FOREIGN PATENT DOCUMENTS

| CN | 101170165 A | 4/2008 |
| EP | 1447864 A1 | 8/2004 |
| EP | 1610407 A1 | 12/2005 |

(Continued)

OTHER PUBLICATIONS

Cho, S., Machine translation of KR 2000-038268 A, Jul. 2000.*

(Continued)

*Primary Examiner* — Sean P Cullen
(74) *Attorney, Agent, or Firm* — Lee & Morse, P.C.

(57) ABSTRACT

A secondary battery includes a case, the case including a first side having a bead thereon, the bead having a height h and a width w, a ratio of the height h to the width w satisfying $$2\% \leq \left(\frac{h}{w} \times 100\right) \leq 50\%,$$

h and w being in a same unit of measure, and an electrode assembly in the case, the electrode assembly including a first electrode, a second electrode, and a separator disposed between the first and second electrodes.

16 Claims, 23 Drawing Sheets

(56) References Cited

FOREIGN PATENT DOCUMENTS

| | | |
|---|---|---|
| JP | 5-53120 | 7/1993 |
| JP | 09-245752 A | 9/1997 |
| JP | 10-255727 A | 9/1998 |
| JP | 2000-113862 A | 4/2000 |
| JP | 2001-057179 A | 2/2001 |
| JP | 2003-123704 A | 4/2003 |
| JP | 2006-508503 | 3/2006 |
| JP | 2006-156049 A | 6/2006 |
| JP | 2007-220413 A | 8/2007 |
| JP | 2008-171649 A | 7/2008 |
| JP | 2009-146692 | 7/2009 |
| KR | 10-2000-0038268 A | 7/2000 |
| KR | 10 2004-0048950 A | 6/2004 |

OTHER PUBLICATIONS

Tosca: http://www.cadgraphics.co.kr/education/mecheducation_view.asp?table=mecheducationboard&seq=286&page=1&SearchPart=BD_SUBJECT&SearchStr= (with partial English translation) (2005).

Korean Office Action in 10-2010-0084890, dated Nov. 24, 2011 (Park, et al.).

Korean Notice of Allowance in KR 10-2010-0084890, dated May 19, 2012 (Park, et al.).

European Office Action in EP 10169657.3-1227, dated May 31, 2012 (Park, et al.).

European Office Action in EP P07517EP, dated Feb. 24, 2011 (Park, et al.).

European Search Report in EP 10169657.3-1227, dated Oct. 13, 2010 (Park, et al.).

European Office Action in EP 10169657.3-1227, dated Dec. 9, 2011 (Park, et al.).

Japanese Office Action Dated Jan. 8, 2013.

Japanese Office Action Dated May 14, 2013.

Chinese Office Action dated Feb. 8, 2014.

Chinese Office Action dated Sep. 24, 2014 for co-pending application CN 201110020014.6; Park et al.

Office Action mailed Mar. 20, 2015 in corresponding Chinese Patent Application No. 201110020014.6.

\* cited by examiner

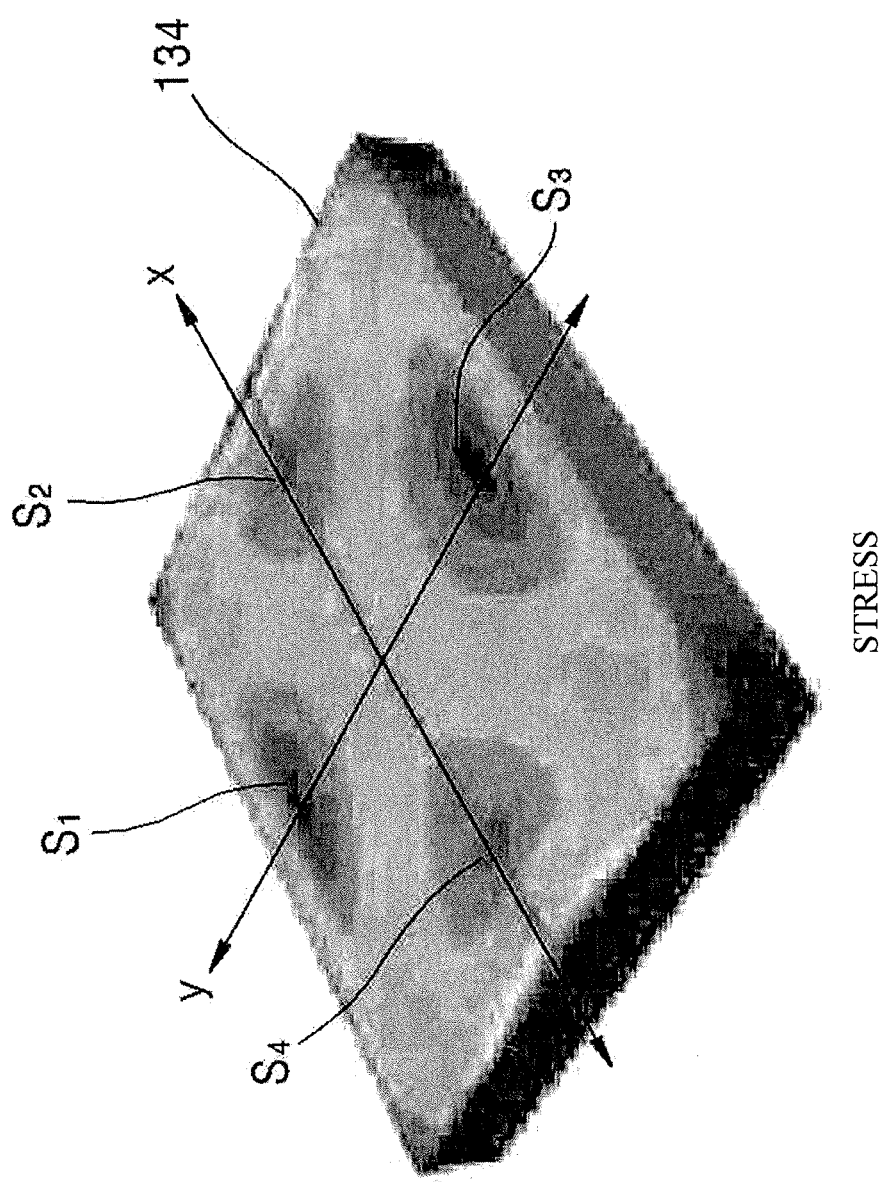

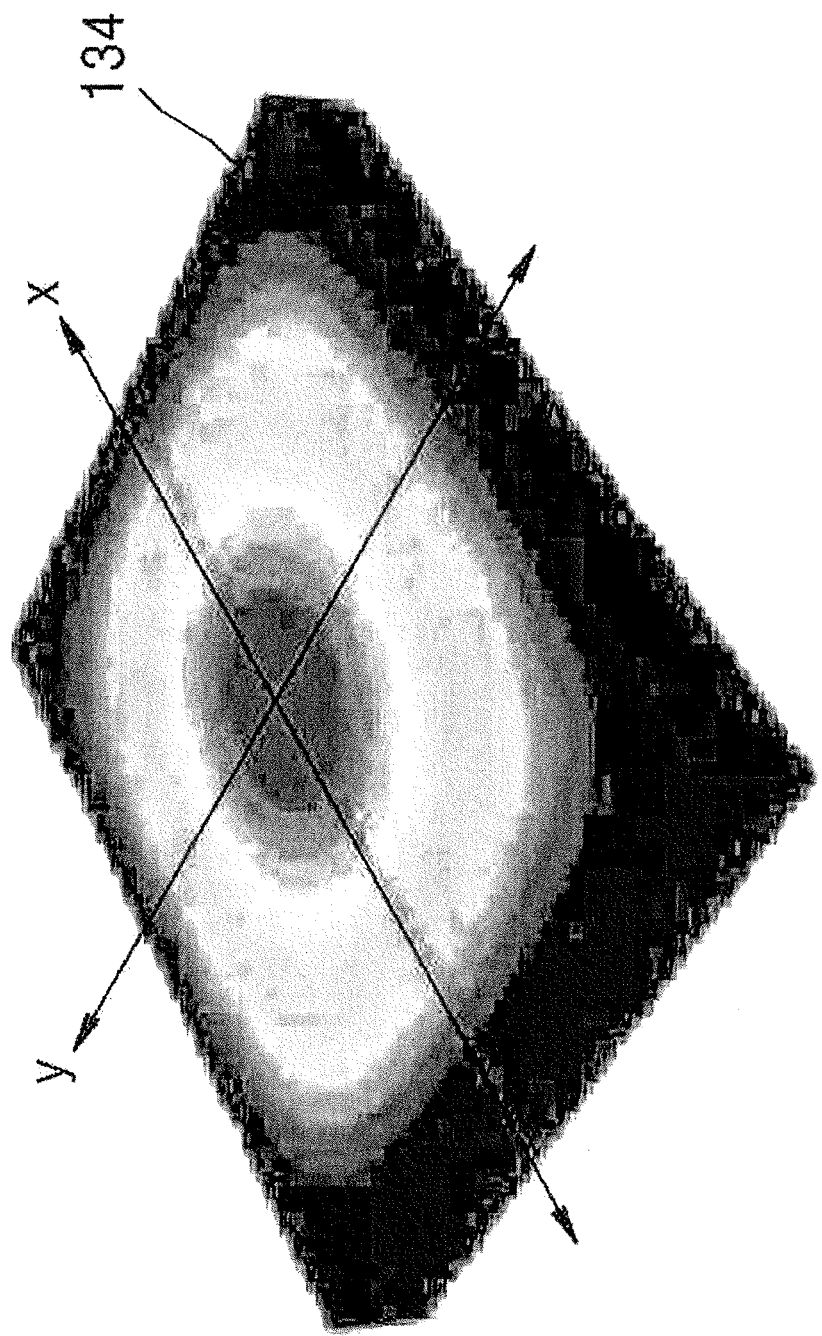

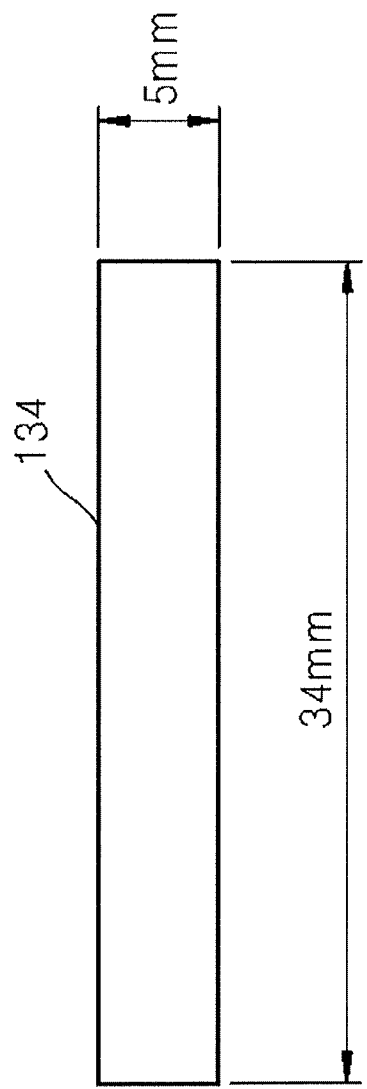

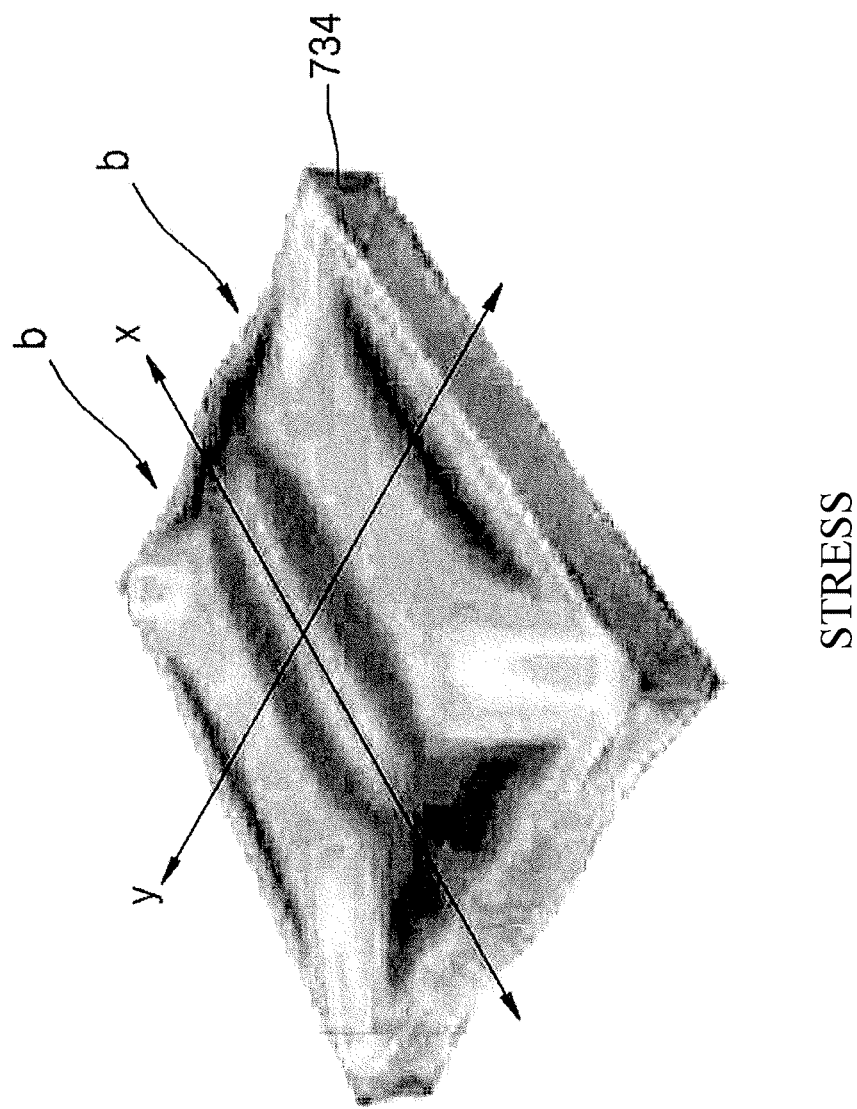

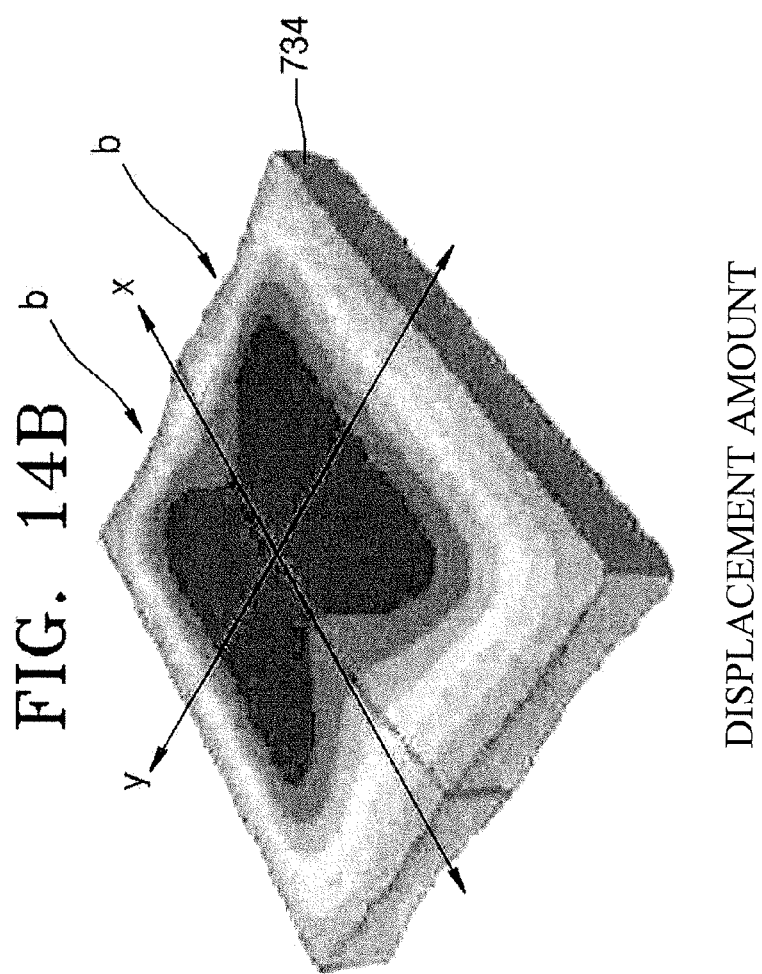

CASE OF SECONDARY BATTERY INCLUDING A BEAD

CROSS-REFERENCE TO RELATED APPLICATION

This application claims priority to U.S. Provisional Application No. 61/282,279, filed in the U.S. Patent and Trademark Office on Jan. 13, 2010, and entitled "SECONDARY BATTERY," which is incorporated by reference herein in its entirety and for all purposes.

BACKGROUND

1. Field

Embodiments relate to a secondary battery.

2. Description of the Related Art

Currently, compact and light electric/electronic devices such as cellular phones, laptop computers, and camcorders are being actively developed and produced. These portable electric/electronic devices include a battery pack so as to operate at places where no power source is provided. The battery pack may include a secondary battery that is rechargeable and dischargeable, and may output a certain level of voltage to drive a portable electric/electronic device for a certain period of time. A battery pack may also be used to power a motive power source, such as in an electric or hybrid vehicle.

Secondary batteries include, for example, nickel (Ni)-cadmium (Cd) batteries, Ni-hydrogen (H) batteries, and lithium (Li) batteries. Li secondary batteries may have a operation voltage of about 3.6V, which is about three times higher than that of Ni—Cd batteries or Ni—H batteries, and may have a high energy density for unit weight. Thus, Li secondary batteries are increasing in popularity.

Li secondary batteries may use a Li-based oxide as a positive electrode active material and a carbon material as a negative electrode active material. In general, according to the type of electrolyte, Li secondary batteries may be classified as liquid electrolyte batteries and polymer electrolyte batteries. Li secondary batteries using a liquid electrolyte may be referred to as Li ion batteries, and Li secondary batteries using a polymer electrolyte may be referred to as Li polymer batteries. Li secondary batteries are manufactured in various shapes such as a cylinder shape, a rectangular shape, and a pouch shape.

A Li ion secondary battery may include an electrode assembly in which a positive electrode plate (on which a positive electrode active material is coated), a negative electrode plate (on which a negative electrode active material is coated), and a separator (disposed between the positive and negative electrode plates so as to prevent a short and to allow movement of Li ions) are wound or stacked. The Li ion secondary battery may also include a case for accommodating the electrode assembly, and an electrolyte injected into the case so as to allow movement of Li ions.

In a Li ion secondary battery, the electrode assembly may be formed by winding or stacking the positive electrode plate (on which the positive electrode active material is coated and to which a positive electrode tab may be connected), the negative electrode plate (on which the negative electrode active material is coated and to which a negative electrode tab is connected), and the separator. The positive electrode active material may contain a complex Li oxide as a main component, e.g., $LiCoO_2$, which may be formed by mixing carbonic acid, Li, and cobalt (Co) oxide in a ratio of 1.2:1 and baking the mixture at a temperature of about 400° C. to about 1000° C. The Li secondary battery may be completed by accommodating the electrode assembly into the case, injecting the electrolyte into the case, and then sealing the case.

When the Li secondary battery is repeatedly recharged, the electrode assembly may repeatedly expand and contract. The expansion and contraction of the electrode assembly may cause a swelling phenomenon such that the case may expand.

SUMMARY

It is a feature of an embodiment to provide a secondary battery capable of efficiently distributing internal pressure and increasing rigidity.

It is a feature of an embodiment to provide a secondary battery that may compensate or prevent volume expansion during recharge and discharge, and may prevent displacement of an electrode assembly caused by increase of internal pressure.

At least one of the above and other features and advantages may be realized by providing a secondary battery, including a case, the case including a first side having a bead thereon, the bead having a height h and a width w, a ratio of the height h to the width w satisfying $$2\% \leq \left(\frac{h}{w} \times 100\right) \leq 50\%,$$

h and w being in a same unit of measure, and an electrode assembly in the case, the electrode assembly including a first electrode, a second electrode, and a separator disposed between the first and second electrodes.

The ratio of the height h to the width w may satisfy $$2\% \leq \left(\frac{h}{w} \times 100\right) \leq 33\%.$$

The ratio of the height h to the width w may satisfy $$2.6\% \leq \left(\frac{h}{w} \times 100\right) \leq 18.8\%.$$

N beads may be on the first side, N being one or more, the first side may have a first length A, A being in millimeters, the N beads extending orthogonal to the first length A, and a ratio of N to the first length A may satisfy $$2\% \leq \left(\frac{N}{A(\text{mm})} \times 100\right) \leq 24\%.$$

Each of the N beads may be a member of a first set of linear beads, the first side may also have a second set of N' beads, the beads of the second set being orthogonal to the beads of the first set, the first side may have a second length B, B being in millimeters, the N' beads extending orthogonal to the second length B, and a ratio of N' to the second length B may satisfy $$2\% \leq \left(\frac{N'}{B(\text{mm})} \times 100\right) \leq 24\%.$$

Respective beads may be disposed between the opposing edges of the first side and the center of the first side, the beads being symmetric about an imaginary line orthogonal to the opposing edges and intersecting the center.

The beads may convolute the battery case so as to increase a surface area of the battery case.

At least one of the above and other features and advantages may also be realized by providing a secondary battery, including a case, the case including a first side, the first side having a first edge and a second edge opposite the first edge, and an electrode assembly in the case, the electrode assembly including a first electrode, a second electrode, and a separator disposed between the first and second electrodes. The first side may have a bead disposed thereon symmetrically with respect to an imaginary line orthogonal to the first edge and the second edge, the imaginary line intersecting centers of the first and second edges.

The bead may be a first linear bead extending between the first and second edges, the bead having a height h and a width w, a ratio of the height h to the width w satisfying $$2\% \leq \left(\frac{h}{w} \times 100\right) \leq 50\%,$$

h and w being in a same unit of measure.

The secondary battery may further include a second linear bead extending orthogonal to the first linear bead.

The second linear bead may intersect the first linear bead.

The bead may encircle the center of the first side.

The bead may be a closed curve.

The secondary battery may include at least one additional bead encircling and concentric with the bead.

The battery case may further include at least two discontinuous bead sections disposed symmetrically with respect to the center of the first side, the discontinuous bead sections being disposed outside the bead such that the bead is between the center of the first side and the discontinuous bead sections.

The first side may have opposing semicircular beads disposed symmetrically with respect to the imaginary line.

At least one of the above and other features and advantages may also be realized by providing a method of forming a secondary battery, the method including providing a case, the case including a first side having a bead thereon, the bead having a height h and a width w, a ratio of the height h to the width w satisfying $$2\% \leq \left(\frac{h}{w} \times 100\right) \leq 50\%,$$

h and w being in a same unit of measure, and disposing an electrode assembly in the case, the electrode assembly including a first electrode, a second electrode, and a separator disposed between the first and second electrodes.

BRIEF DESCRIPTION OF THE DRAWINGS

The above and other features and advantages will become more apparent to those of skill in the art by describing in detail example embodiments with reference to the attached drawings, in which:

FIG. 8A illustrates a schematic perspective view showing stress when internal pressure is applied to a rectangular case;

FIG. 8B illustrates a schematic perspective view showing a displacement amount of the case of FIG. 8A;

FIG. 8C illustrates a front view of the case of FIG. 8A;

FIG. 14A illustrates a schematic perspective view showing stress distribution when two beads are formed on a case, according to another embodiment;

FIG. 14B illustrates a schematic perspective view showing a displacement amount of the case of FIG. 14A;

DETAILED DESCRIPTION

Figure 1:
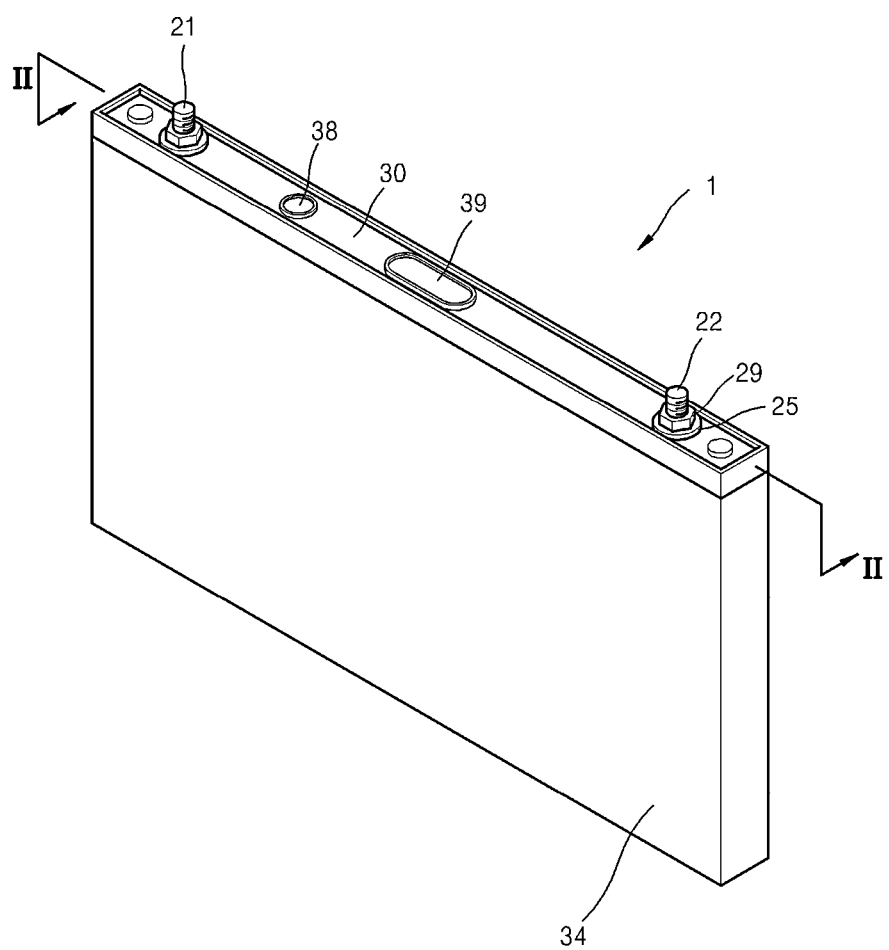
FIG. 1 illustrates a schematic perspective view of a secondary battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
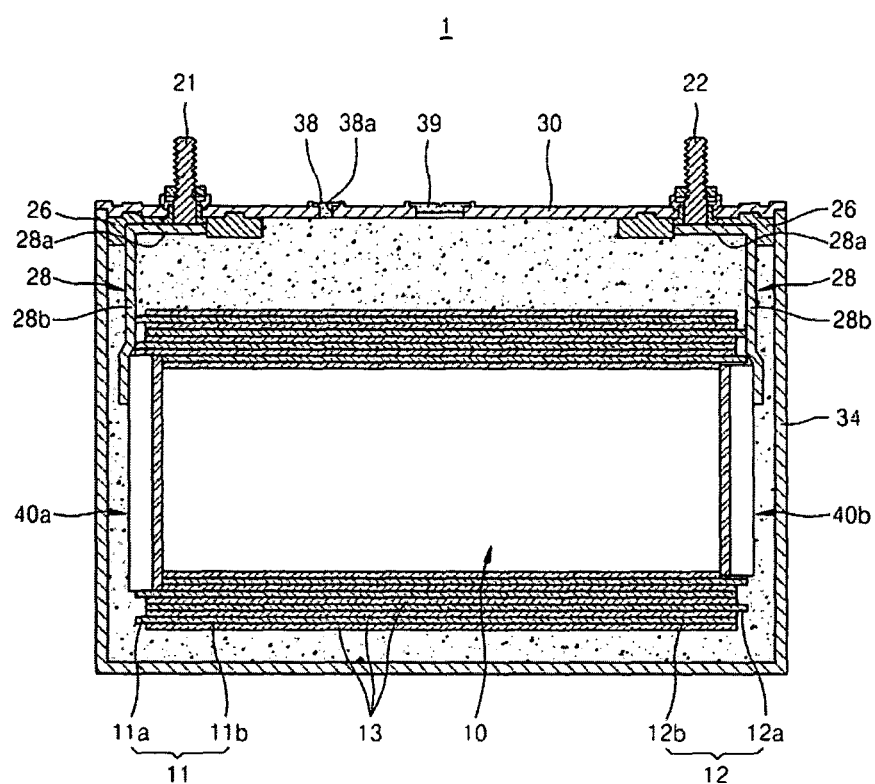
FIG. 2 illustrates a cross-sectional view cut along a line II-II of FIG. 1.

The structure of a secondary battery 1 will now be described with reference to FIGS. 1 and 2, after which the structure of a case 34 capable of efficiently withstanding internal pressure will be described. FIG. 1 illustrates a schematic perspective view of a secondary battery. FIG. 2 illustrates a cross-sectional view cut along a line II-II of FIG. 1.

Referring to FIGS. 1 and 2, the secondary battery 1 may include an electrode assembly 10, positive and negative terminals 21 and 22, and the case 34. The case 34 may accommodate the electrode assembly 10, and the electrode assembly 10 may be electrically connected to an external device via the positive and negative terminals 21 and 22.

The electrode assembly 10 may include a positive electrode 11, a negative electrode 12, and a separator 13. The positive and negative electrodes 11 and 12 may be wound with the separator 13, i.e., an insulator, interposed therebetween so as to form the electrode assembly 10. A center pin (not shown) may be disposed in the electrode assembly 10, and the positive and negative electrodes 11 and 12 may be wound around the center pin. In another implementation, the positive electrode 11, the separator 13, and the negative electrode 12 may be stacked. The positive and negative electrodes 11 and 12 may respectively include positive and negative uncoated parts 11a and 12a and positive and negative coated parts 11b and 12b.

Each of the positive and negative uncoated parts 11a and 12a may be a region of a current collector formed of thin metal foil on which an active material is not coated, while each of the positive and negative coated parts 11b and 12b may be a region of a current collector formed of thin metal foil on which an active material is coated.

A positive current collecting unit 40a may be welded to the positive uncoated part 11a of the electrode assembly 10. The positive current collecting unit 40a may be electrically connected to the positive terminal 21 via a lead member 28. As such, the positive terminal 21 may be connected to the positive electrode 11 of the electrode assembly 10 via the lead member 28 and the positive current collecting unit 40a. A negative current collecting unit 40b may be electrically connected to the negative terminal 22 via the lead member 28. As such, the negative terminal 22 may be connected to the negative electrode 12 of the electrode assembly 10 via the lead member 28 and the negative current collecting unit 40b.

An insulating member 26 may be formed between the lead member 28 and a cap plate 30. The lead member 28 may include a current collecting lead unit 28b bonded to the positive and negative current collecting units 40a and 40b, and a terminal lead unit 28a bonded to the positive and negative terminals 21 and 22. The positive and negative terminals 21 and 22 may be respectively and electrically connected to the positive and negative electrodes 11 and 12 of the electrode assembly 10, and may protrude out of the case 34.

The case 34 may include the cap plate 30 on one side. The case 34 may have a rectangular can shape of which one side is open, and the open side of the case 34 may be sealed by using the cap plate 30. The cap plate 30 may cover the case 34 while allowing the positive and negative terminals 21 and 22 to protrude out of the case 34. When the electrode assembly 10 and an electrolyte are accommodated in the case 34, the case 34 and the cap plate 30 may be laser-welded to each other so as to seal the electrode assembly 10 and the electrolyte in the case 34. The cap plate 30 may be a thin plate.

The cap plate 30 may include a vent member 39 on which grooves are formed, the grooves to be broken when the internal pressure of the case 34 reaches a predetermined value. An electrolyte inlet 38a, through which the electrolyte is injected into the case 34, may be formed in the cap plate 30. A sealing plug 38 may fit in and seal the electrolyte inlet 38a.

The secondary battery 1 may have various shapes besides the rectangular shape shown in FIGS. 1 and 2. For example, the secondary battery 1 may be a cylinder-type secondary battery or a polymer-type secondary battery. Further, the electrode assembly 10 may be formed as a winding type with a center pin, as a stacking type, etc.

In the secondary battery 1, the electrode assembly 10 may expand or contract due to recharge and discharge. The expansion and contraction of the electrode assembly 10 may act as a physical force on the case 34. Thus, the case 34 may expand or contract accordingly. As such, the expansion and contraction of the electrode assembly 10 may displace the case 34. Also, repeated expansion and contraction of the electrode assembly 10 may fix the displacement of the case 34. If the case 34 is displaced due to the electrode assembly 10 being expanded, the efficiency of the secondary battery 1 may be reduced. Also, when recharge and discharge are repeated, an active material coated on the positive and negative coated parts 11b and 12b may be removed or may deteriorate.

Embodiments provide structures of the case 34 that are configured to distribute internal pressure and increase rigidity by modifying the case 34. This may be achieved without having any further components. In order to lower stress on the case 34 and to reduce a displacement amount of the case 34 when the electrode assembly 10 expands, the case 34 may satisfy one or more of the following three conditions. First, a surface area of the case 34 may be increased. Second, the internal pressure in the case 34 may be distributed. Third, the rigidity of the case 34 may be increased. The three conditions with respect to the case 34 will now be described in detail.

Figure 3:
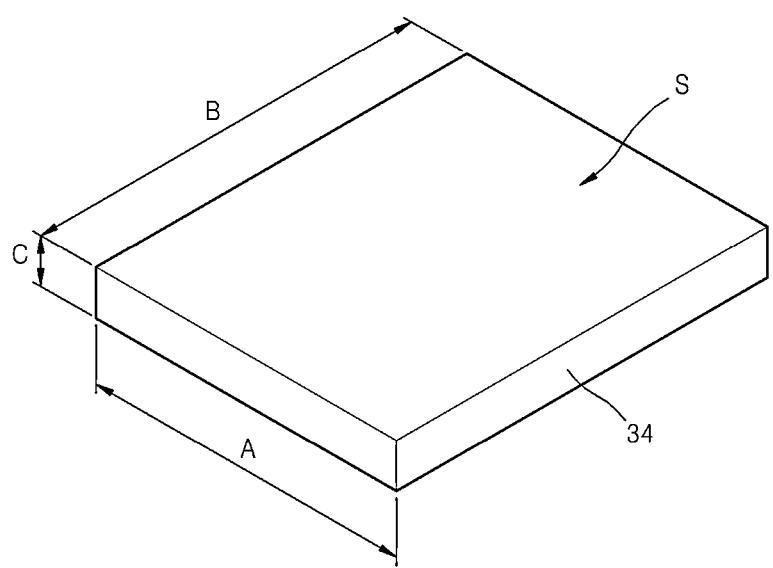
FIG. 3 illustrates a schematic perspective view of a case including different-length sides.

First, referring FIG. 3, increasing the surface area of the case 34 to suppress displacement of the case 34 will be described. FIG. 3 illustrates a schematic perspective view of a case 34 including different-length sides A, B, and C. Stress a will be described with reference to FIG. 3. The stress σ refers to a force F that acts on a unit area S. The unit area S refers to a surface area of the case 34 on which the force F acts. The stress σ is defined as represented in Equation 1.

$$\sigma = \frac{Force(F)}{UnitArea(S)} \propto \frac{1}{S} \qquad \langle \text{Equation 1} \rangle$$

For example, the force F may be generated due to internal pressure in the case 34 caused by expansion or contraction of the electrode assembly 10 illustrated in FIG. 2. However, the cause of the force F is not limited thereto, and the force F may be generated due to various causes such as an increase in the internal pressure due to a gas being generated in the case 34.

Figure 4A:
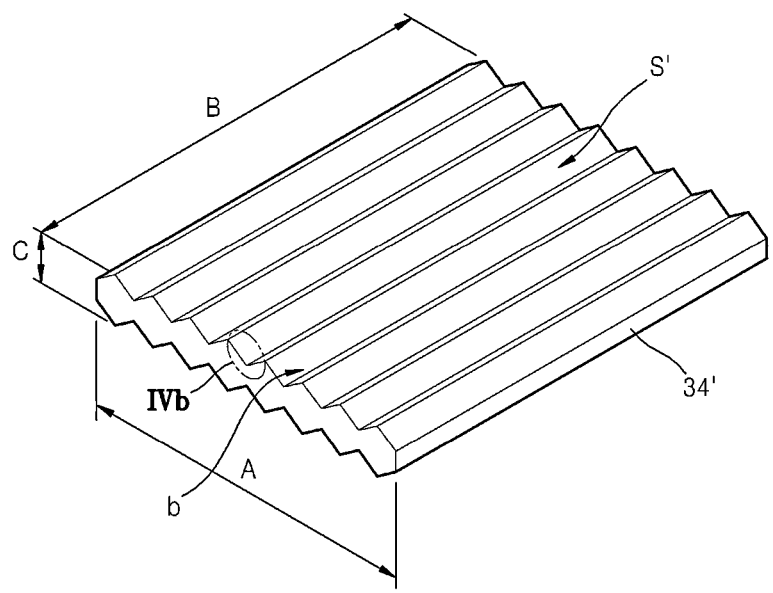
FIG. 4A illustrates a schematic perspective view of a case on which beads are formed so as to increase a unit area of the case, according to an embodiment.
Figure 4B:
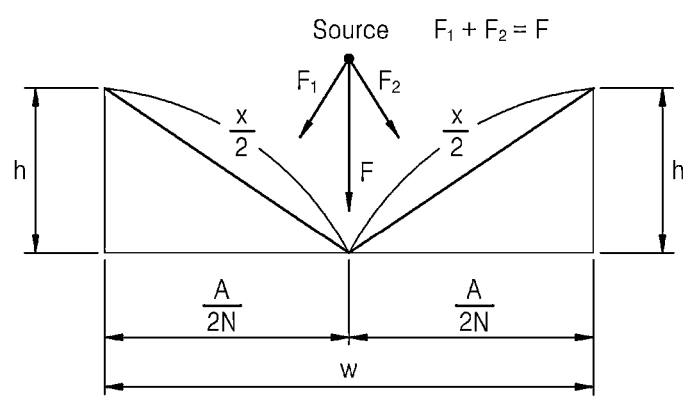
FIG. 4B illustrates a schematic conceptual view of a portion IVb of FIG. 4A.

According to Equation 1, the stress a is inversely proportional to the unit area S. Accordingly, when the force F is constant, if the unit area S increases, the stress a decreases. In this case, the decreasing of the stress a means that the force F on the unit area S (i.e., F/S) to displace the case 34 in a region of the case 34 decreases. Accordingly, in order to withstand the internal pressure of the case 34 and to efficiently suppress displacement of the case 34, the case 34' may have a structure for increasing the unit area S. In this case, displacement of the case 34 may be suppressed by distributing a direction of the force F, as well as by increasing the unit area S of the case 34. As shown in FIG. 4B, the force F may have components $F_1$ and $F_2$, where $F_1 + F_2 = F$.

A case 34' having a surface configured to increase the unit area S will now be described with reference to FIGS. 4A and 4B. As illustrated in FIGS. 4A and 4B, in order to increase the unit area S of the case 34', beads b having the same ratio of a width w to a peak height h may be formed on surfaces of the case 34'. For a projecting bead b, the width w may be measured from peak to peak, and for a recessed bead b, the width w may be measured from edge to edge. The beads b are not restricted to having the same size. The beads b may have different sizes in the same ratio of the width w to the peak height h.

When one side of the case 34' has a length (A) and a number (N) of beads b are formed on the side having the length (A), the width w of the beads b is A/N In this case, as illustrated in FIG. 4B, a length x of a hypotenuse of the beads b may be calculated as represented in Equation 2 by using the Pythagorean theorem.

$$x = 2A\sqrt{\frac{1}{4N^2} + \left(\frac{h}{A}\right)^2} \quad \langle \text{Equation 2} \rangle$$

Here, since N beads b are formed on the case 34', the unit area S' satisfies Equation 3.

$$S'' = x \cdot N \cdot B = B\sqrt{A^2 + 4N^2 h^2} \quad \text{<Equation 3>}$$

Ideally, in order to maximize the unit area S', the number N and the peak height h of the beads b would be infinite. However, since an infinite number N and the peak height h of the beads b is not practical, ranges of the number N and the peak height h of the beads b may be determined by distributing pressure and increasing rigidity.

Figure 5:
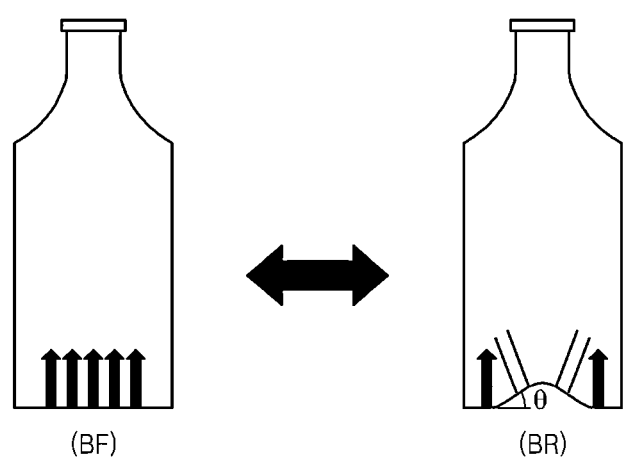
FIG. 5 illustrates a schematic conceptual view for describing a principal of pressure distribution.

The principal of pressure distribution will now be described with reference to FIG. 5. Referring to FIG. 5, in comparison to a bottle having a flat bottom surface BF, a bottle having an internally protruding bottom surface BR may distribute pressure applied onto the bottom surface so as to withstand high pressure. Internal pressure distribution may differ according to a width w and a peak height h of a round bead formed in the bottom surface. In this case, when an angle θ of the bead is equal to 45°, force distribution is maximized. Accordingly, the angle θ of the bead may be equal to or less than 45°. Here, when the angle θ of the bead is 45°, h/w is ½ and thus $$\frac{h}{w} \times 100$$

may be equal to or less than 50%, h and w being measured in the same units, e.g., millimeters (mm).

The bottle having the internally protruding bottom surface BR may also compensate with respect to volume expansion of the bottle. In more detail, the bottle may be formed of a bendable material, and when the bottle expands due to an increase in internal pressure, the internally protruding bottom surface may move so as to increase the internal volume of the bottle, thereby preventing the bottle from breaking or exploding. The same principal may also be considered with respect to the case 34' illustrated in FIG. 4A. When the internal pressure in the case 34' increases, the beads b protruding into the case 34' may protrude out of the case 34' so as to compensate for the increase in the internal pressure, and thus the case 34' may be prevented from breaking or exploding.

Figure 6A:
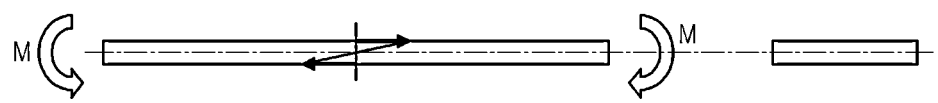
FIG. 6A illustrates side and front views of a plate for describing a principal of bending stress.
Figure 6B:
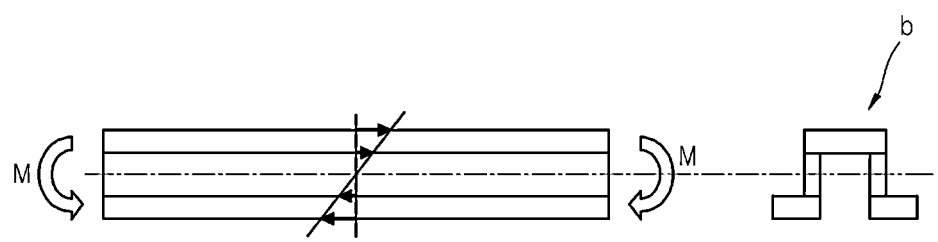
FIG. 6B illustrates side and front views of a structure on which a bead is formed.
Figure 7:
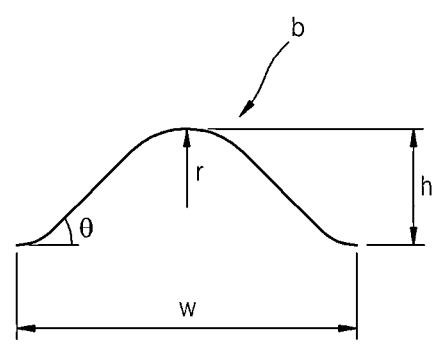
FIG. 7 illustrates a schematic conceptual view of a bead having a width, a height, an angle, and a curvature.

FIG. 6A illustrates side and front views of a plate for describing a principal of bending stress. FIG. 6B illustrates side and front views of a structure on which a bead is formed. FIG. 7 illustrates a schematic conceptual view of a bead having a width w, a height h, an angle θ, and a curvature r of a bead b. In FIGS. 6A and 6B, thin arrows represent the bending stress and large arrows represent a bending moment M.

The bending stress may be represented by Equation 4.

$$\sigma = \frac{M \times c}{I} \quad \langle \text{Equation 4} \rangle$$

In Equation 4, a represents the bending stress, M represents the bending moment, c represents a distance from a central axis to an outer surface, on which the maximum stress occurs, and I represents a moment of inertia.

As represented in Equation 4, the bending stress σ is inversely proportional to the moment of inertia I. Thus, the bending stress σ may be reduced by increasing the moment of inertia I. If a bead b is formed on the plane in order to increase the moment of inertia I, the bending stress σ may be reduced. Thus, the bead b may be formed on a surface of the case 34 illustrated in FIG. 3 in order to increase the bending stress σ.

Referring to FIG. 7, parameters that determine the bending stress σ are a width w, a peak height h, an angle θ, and a curvature r of the bead b. Where and in which direction the bead b is formed on the case 34' also influence the bending stress σ. Here, an angle θ of the bead b is equal to or less than 45°. Also, force distribution is maximized when the shape of the bead b is a semicircle. Thus, a curvature r has a maximum value when a diameter of the bead b is equal to a width w of the bead b (2r≤w).

When the parameters satisfy ranges listed in Table 1, the case 34' may withstand internal pressure more efficiently. That is, the case 34' may efficiently distribute internal pressure and may increase rigidity according to the ranges listed in Table 1.

TABLE 1

| Parameter | Range |
|---|---|
| Ratio of Peak Height to Width of Bead | 0~50% |
| Ratio of Number of Beads (N) to Length (A) of One Side | 2%~24% |
| Number of Beads (N) | 1~10 |

TABLE 1-continued

| Parameter | Range |
| --- | --- |
| Angle of Bead (θ) | $0 < \theta \leq 45°$ |
| Curvature of Bead (r) | $0 < r \leq \dfrac{w}{2}$ |

The ratio of the peak height to the width of the bead may be about 0% to about 50% and, more particularly, about 2% to about 33%. The number of beads may be about 1 to about 10, or more.

Where and in which direction the beads b are formed on the case 134 will now be described with reference to FIGS. 8A through 8C. FIG. 8A illustrates a schematic perspective view showing stress when internal pressure is applied to a rectangular case 134. FIG. 8B illustrates a schematic perspective view showing a displacement amount of the case 134 of FIG. 8A. FIG. 8C illustrates a front view of the case 134 of FIG. 8A.

Referring to FIG. 8A, $S_1$, $S_2$, $S_3$, and $S_4$ indicate stress-concentrated portions on the case 134, and are symmetrical with respect to x and y axes. Accordingly, in order to distribute stress on the case 134, the beads b may be formed on the case 134 symmetrically with respect to the x axis, the y axis, or both the x and y axes. Also, the beads b do not need to be sequentially formed, and may be partially formed in correspondence with displacement or stress-concentrated portions so as to distribute displacement or stress. Referring to FIG. 8B, the amount of displacement may be concentrated concentrically from the intersection of the x and y axes of the case 134, i.e., displacement may be greatest at the center or origin of the x-y axes. Thus, in order to suppress the displacement, beads b may be formed concentrically from the intersection of the x and y axes of the case 134.

Hereinafter, shapes and arrangements of the beads b according to embodiments will be described with reference to FIGS. 9A and 9B, 10A and 10B, 11A and 11B, and 12A and 12B, and variations in displacement amount according to the number N and the ratio of the peak height h to the width $$w\left(\frac{h}{w} \times 100\right)$$

of the beads b will be described with reference to FIGS. 13A through 13C, 14A through 14C, and 15A through 15D.

The shapes and arrangements of the beads b formed on the case 134 will be described with reference to FIGS. 9A and 9B, 10A and 10B, 11A and 11B, and 12A and 12B.

As described above with reference to FIG. 8A, a displacement amount may vary concentrically from the center of a surface of the rectangular case 134 (an origin of x and y coordinates). Also, the portions $S_1$, $S_2$, $S_3$, and $S_4$ corresponding to four sides from the center of the surface may be stress-concentrated portions. Accordingly, the beads b may be formed concentrically from the center of the surface, may be formed in correspondence with the stress-concentrated portions, or may be formed both concentrically from the center of the surface and in correspondence with the stress-concentrated portions.

Figure 9A:
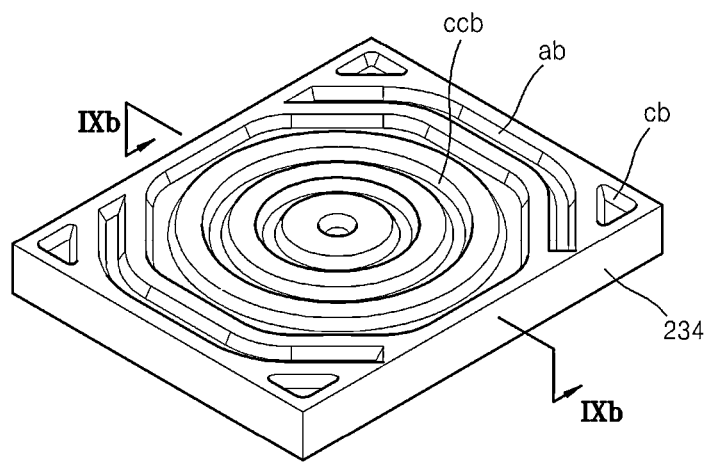
FIG. 9A illustrates a schematic perspective view of a case on which concentric beads are formed from the center of a surface of the case in correspondence with variations in displacement amount, according to another embodiment.
Figure 9B:
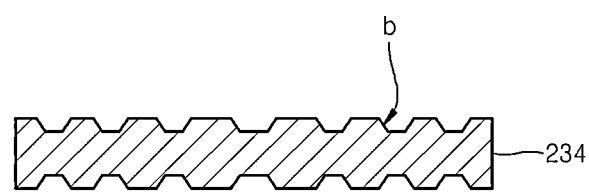
FIG. 9B illustrates a cross-sectional view cut along a line IXb-IXb of FIG. 9A.

FIG. 9A illustrates a schematic perspective view of a case 234 on which concentric beads ccb are formed from the center of a surface of the case 234 in correspondence with variations in displacement amount, according to another embodiment. FIG. 9B illustrates a cross-sectional view cut along a line IXb-IXb of FIG. 9A. As described in further detail below, the beads b may include the concentric beads ccb, linear beads lb, and radial beads rb formed in correspondence with stress-concentrated portions or variations in displacement amount, and may also include corner beads cb and assistant beads ab formed in correspondence with the arrangement and functions of the beads b.

Referring to FIGS. 9A and 9B, the concentric beads ccb may be formed around the center of the surface of the case 234. In this case, the corner beads cb may be additionally formed at corners of the case 234. Also, if the surface of the case 234 on which the beads b are formed is not square, the assistant beads ab may also be formed in correspondence with the shape of remaining portions where the concentric beads ccb are not formed. In another implementation, the beads b may be formed in correspondence with the portions $S_1$, $S_2$, $S_3$, and $S_4$ illustrated in FIG. 8A, where stress is concentrated, as illustrated in FIGS. 10A and 10B.

Figure 10A:
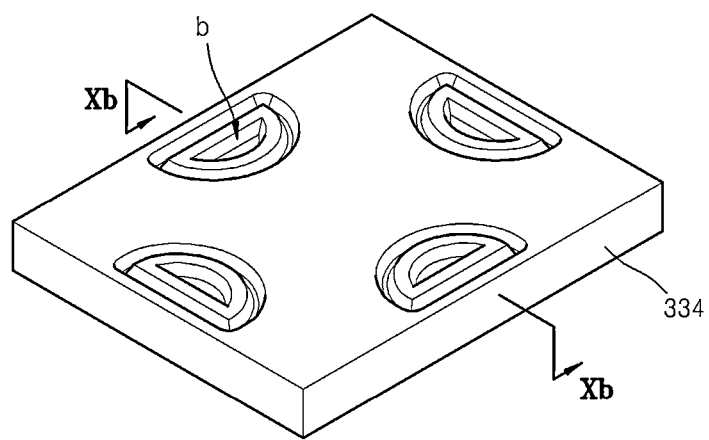
FIG. 10A illustrates a schematic perspective view of a case on which beads are formed on a surface of the case in correspondence with stress-concentrated portions, according to another embodiment.

FIG. 10A illustrates a schematic perspective view of a case 234 on which beads b are formed on a surface of the case 334 in correspondence with stress-concentrated portions, according to another embodiment. FIG. 10B illustrates a cross-sectional view cut along a line Xb-Xb of FIG. 10A.

Figure 10B:
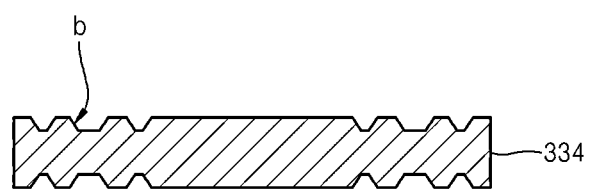
FIG. 10B illustrates a cross-sectional view cut along a line Xb-Xb of FIG. 10A.

Referring to FIGS. 10A and 10B, the beads b may be formed in correspondence with portions of the case 334 where stress is concentrated, i.e., on perpendicular lines from the center of the surface to four sides of the case 334. The stress-concentrated portions may be located on the x or y axis of the rectangular case 334. Thus, the beads b may be formed such that the centers of the beads b are disposed on the x or y axis. The beads b are not limited to the shape illustrated in FIGS. 10A and 10B, and may be various shapes such as linear and non-linear shapes.

Figure 11A:
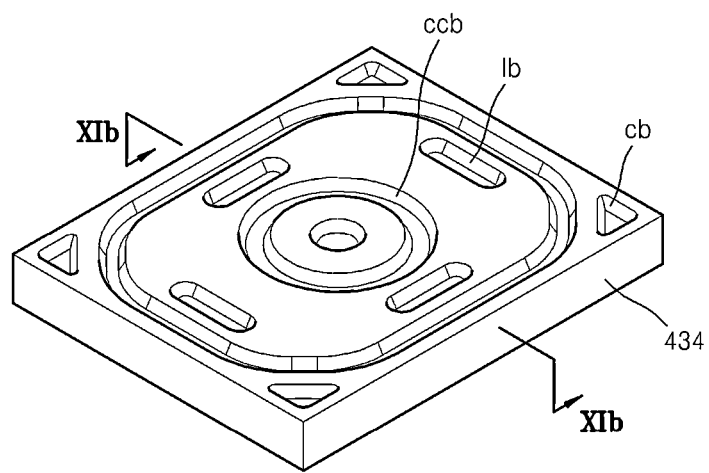
FIG. 11A illustrates a schematic perspective view of a case on which concentric beads and linear beads are formed on a surface of the case in correspondence with variations in displacement amount and stress-concentrated portions, according to another embodiment.
Figure 11B:
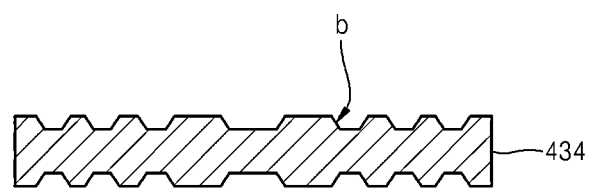
FIG. 11B illustrates a cross-sectional view cut along a line XIb-XIb of FIG. 11A.

In another embodiment, the beads b may be formed in correspondence with variations in displacement amount and stress-concentrated portions, as illustrated in FIGS. 11A and 11B. FIG. 11A illustrates a schematic perspective view of a case 434 on which concentric beads ccb and linear beads lb are formed on a surface of the case 434 in correspondence with variations in displacement amount and stress-concentrated portions, according to another embodiment. FIG. 11B illustrates a cross-sectional view cut along a line XIb-XIb of FIG. 11A.

Referring to FIGS. 11A and 11B, the concentric beads ccb may be formed near the center and sides of the case 434, and the linear beads lb may be formed at the stress-concentrated portions between the concentric beads ccb. Also, the corner beads cb may be formed at corners of the case 434. The beads are not limited to the shapes illustrated in FIGS. 11A and 11B, and may have various shapes as illustrated in FIGS. 12A and 12B.

Figure 12A:
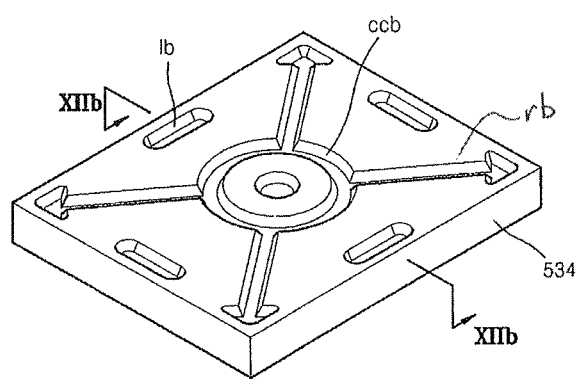
FIG. 12A illustrates a schematic perspective view of a case on which concentric beads, linear beads, and radial beads are formed on a surface of the case in correspondence with variations in displacement amount and stress-concentrated portions, according to another embodiment.

FIG. 12A illustrates a schematic perspective view of a case 534 on which concentric beads ccb, linear beads lb, and radial beads rb are formed on a surface of the case 534 in correspondence with variations in displacement amount and stress-concentrated portions, according to another embodiment. FIG. 12B illustrates a cross-sectional view cut along a line XIIb-XIIb of FIG. 12A.

Figure 12B:
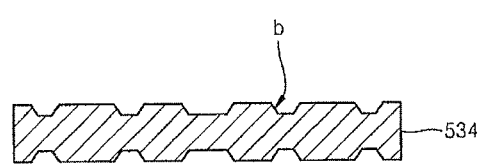
FIG. 12B illustrates a cross-sectional view cut along a line XIIb-XIIb of FIG. 12A.

Referring to FIGS. 12A and 12B, the radial beads rb may be formed in addition to the concentric beads ccb and the linear beads lb. The beads b may be formed having x-axis symmetry, y-axis symmetry, or origin symmetry with respect to the intersection of the x and y axes of a surface of the case 534 in order to distribute stress.

Table 2 illustrates the stress amounts and displacement amounts of the cases of FIG. 3, FIGS. 9A through 9B, and FIGS. 12A through 12B.

TABLE 2

|  | FIG. 3 | FIGS. 9A through 9B | FIGS. 12A through 12B |
|---|---|---|---|
| Stress Amount (MPa) | 22.98 | 0.07 | 0.84 |
| Stress Amount Reduction (%) | — | 99% | 96% |
| Displacement Amount (mm) | 2.9 | 0.495 | 1.909 |
| Displacement Amount Reduction (%) | — | 83% | 34% |

As shown in Table 2, the stress amounts and displacement amounts of the embodiments of FIGS. 9A through 9B and FIGS. 12A through 12B are significantly reduced relative to that shown in FIG. 3, in which no beads are formed. Also, with respect to the embodiments of FIGS. 9A through 9B, and FIGS. 12A through 12B, the embodiment of FIG. 9A through 9B has less strain amount and displacement amount. Here, even though at least one concentric bead ccb having 2 mm width and 0.8 mm depth is formed on the embodiments of FIGS. 9A through 9B, and FIGS. 12A through 12B, the amounts of strain and displacement may vary. Without being bound by theory, one of the possible reasons for such is that the additional concentric beads ccb are formed on the embodiment of FIGS. 9A through 9B, whereas further radial beads rb are formed on the embodiments of FIGS. 12A through 12B. Thus, it can also be inferred that one or more concentric beads ccb may be efficient in reducing the amounts of stress and displacement.

Hereinabove, the shapes and arrangements of the beads b formed on the cases 234, 334, and 434 against stress concentration and displacement are described with reference to FIGS. 9A and 9B, 10A and 10B, 11A and 11B, and 12A and 12B. Variations in displacement amount according to the number N and the ratio of the peak height h to the width $$w\left(\frac{h}{w} \times 100\right)$$

of the beads b will now be described with reference to FIGS. 13A through 13C, 14A through 14C, and 15A through 15D. Here, FIGS. 9A and 9B, 10A and 10B, 11A and 11B, and 12A and 12B may be related to FIGS. 13A through 13C, 14A through 14C, and 15A through 15D. That is, although not described below, the battery case may have any of the shapes and arrangements of the beads b illustrated in FIGS. 9A and 9B, 10A and 10B, 11A and 11B, and 12A and 12B, and may also have the numbers N and the ratios of the peak height h to the width $$w\left(\frac{h}{w} \times 100\right)$$

of the beads b to be described with reference to any of FIGS. 13A through 13C, 14A through 14C, and 15A through 15D, at the same time.

Figure 13A:
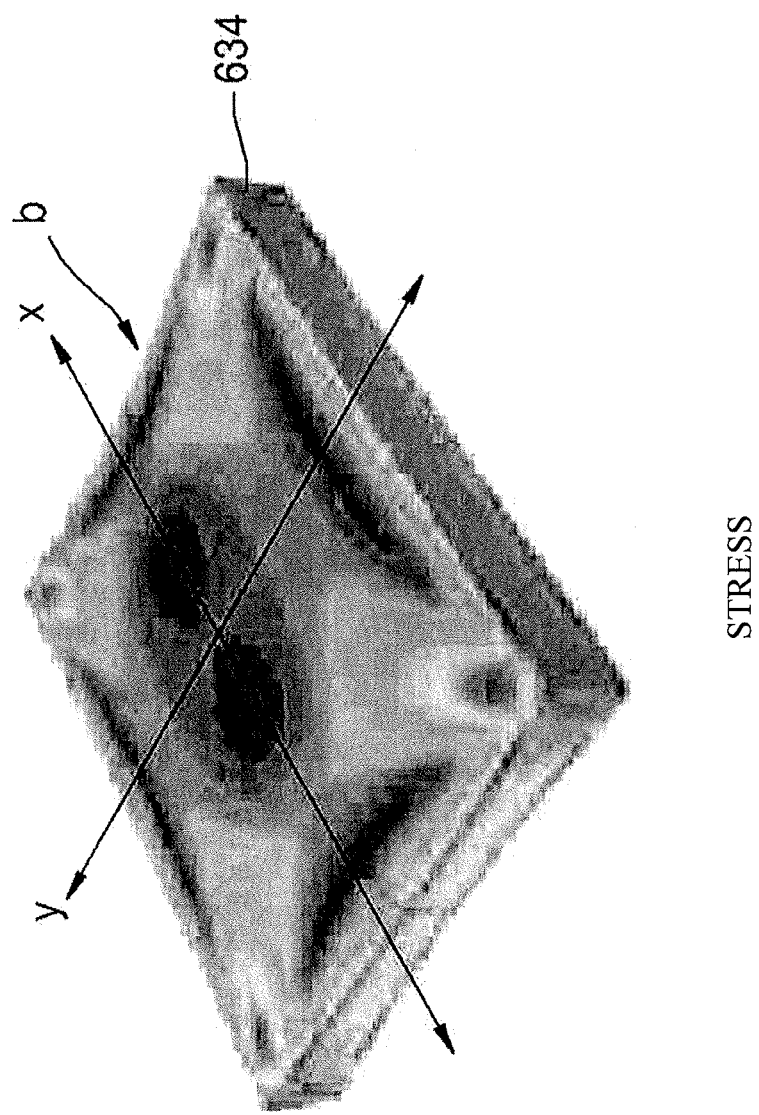
FIG. 13A illustrates a schematic perspective view showing stress distribution when one bead is formed on a case, according to another embodiment.
Figure 13B:
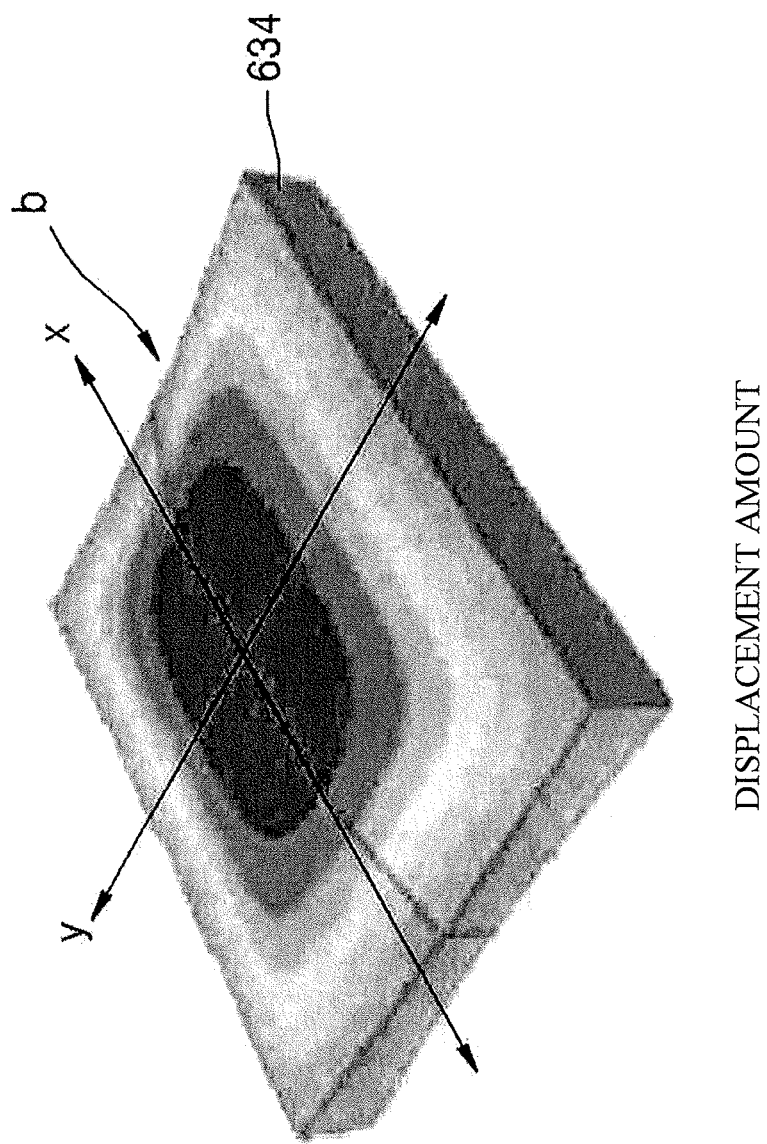
FIG. 13B illustrates a schematic perspective view showing a displacement amount of the case illustrated in FIG. 13A.
Figure 13C:
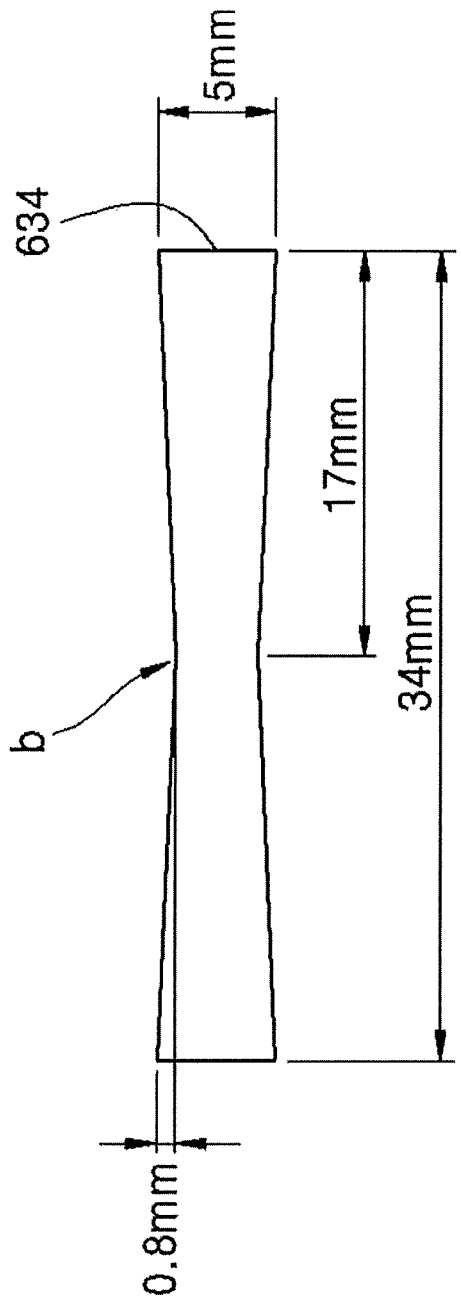
FIG. 13C illustrates a front view of the case of FIG. 13A.
Figure 14C:
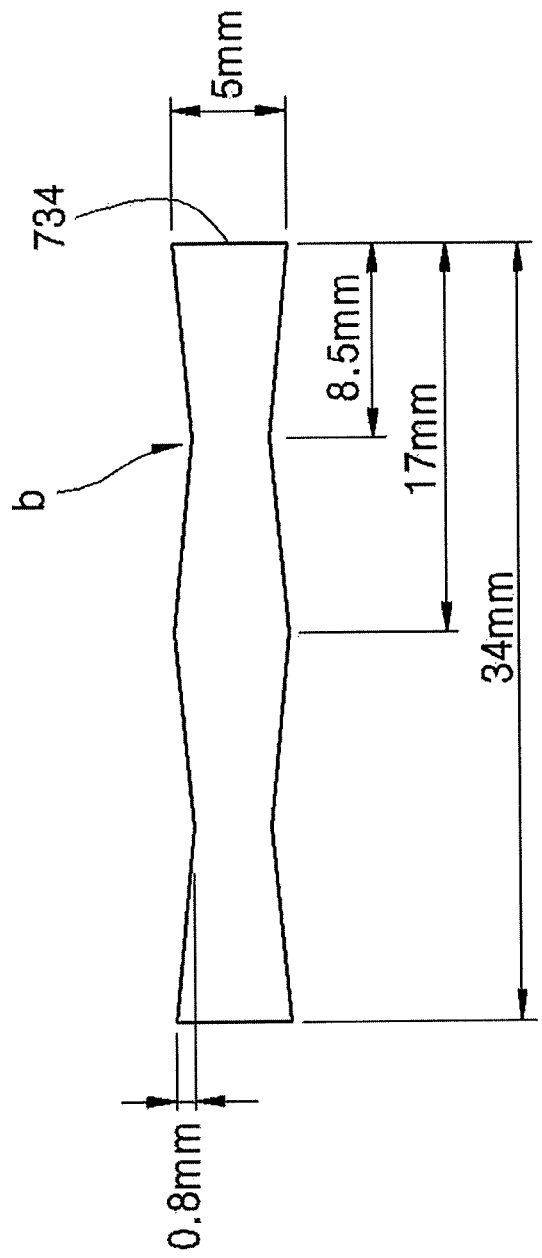
FIG. 14C illustrates a front view of the case of FIG. 14A.
Figure 15A:
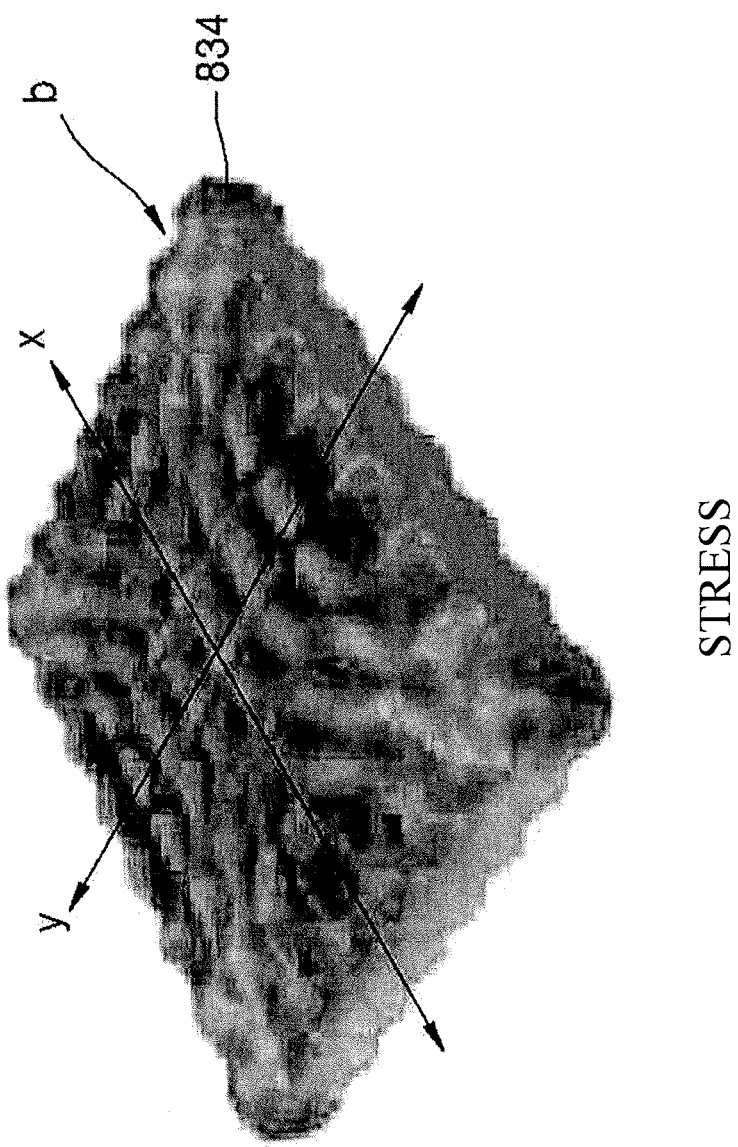
FIG. 15A illustrates a schematic perspective view showing stress distribution when eight beads are formed on four sides of a case, according to another embodiment.
Figure 15B:
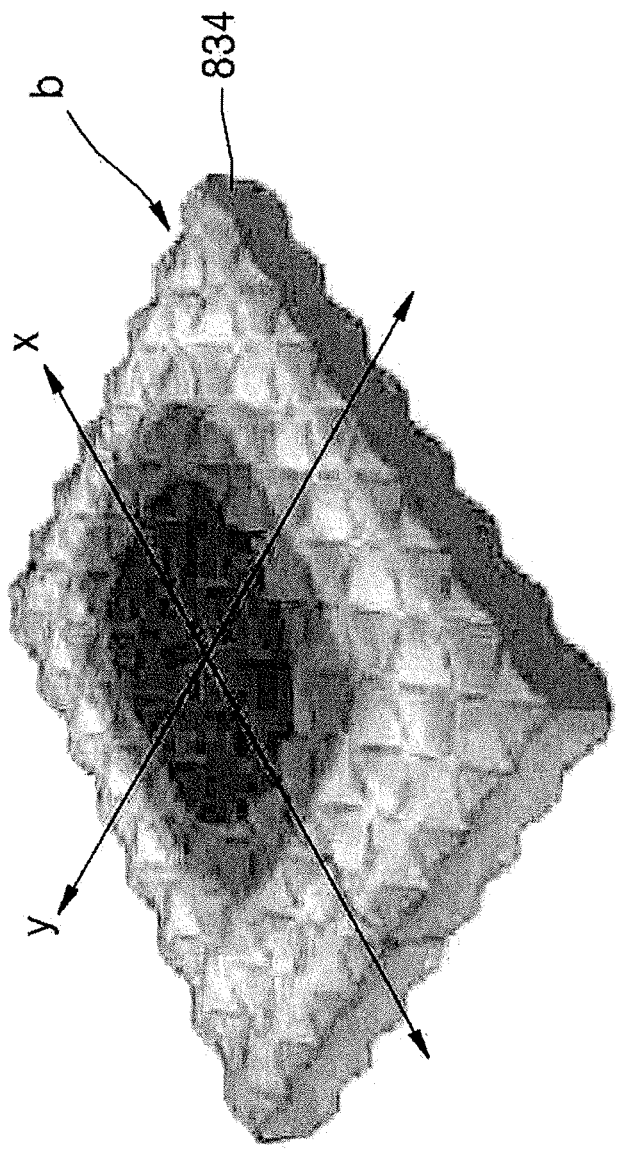
FIG. 15B illustrates a schematic perspective view showing a displacement amount of the case of FIG. 15A.
Figure 15C:
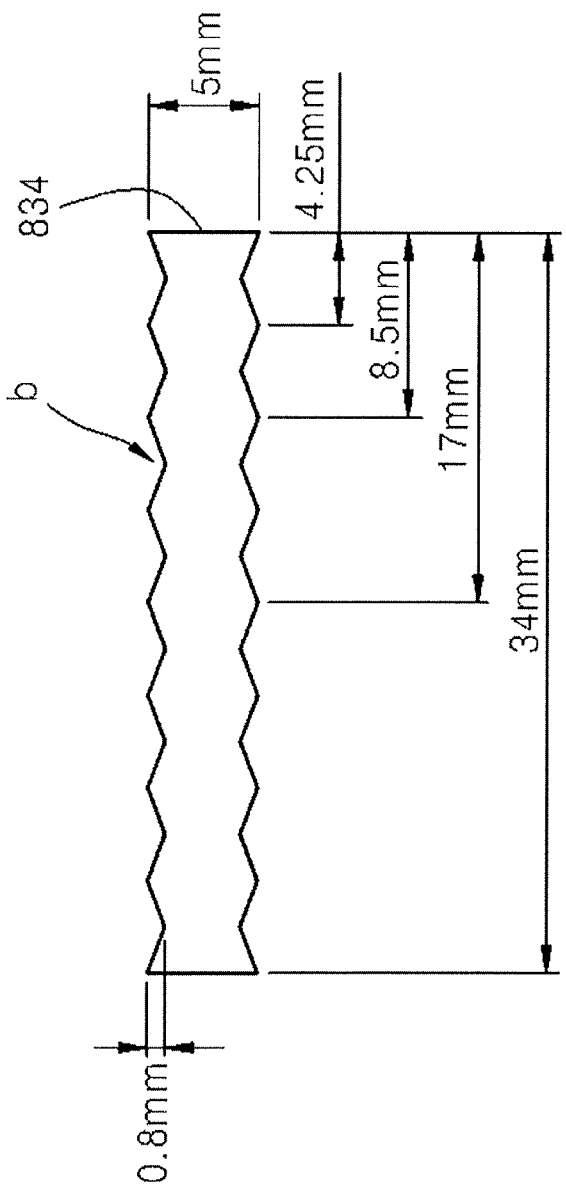
FIG. 15C illustrates a front view of the case of FIG. 15A.
Figure 15D:
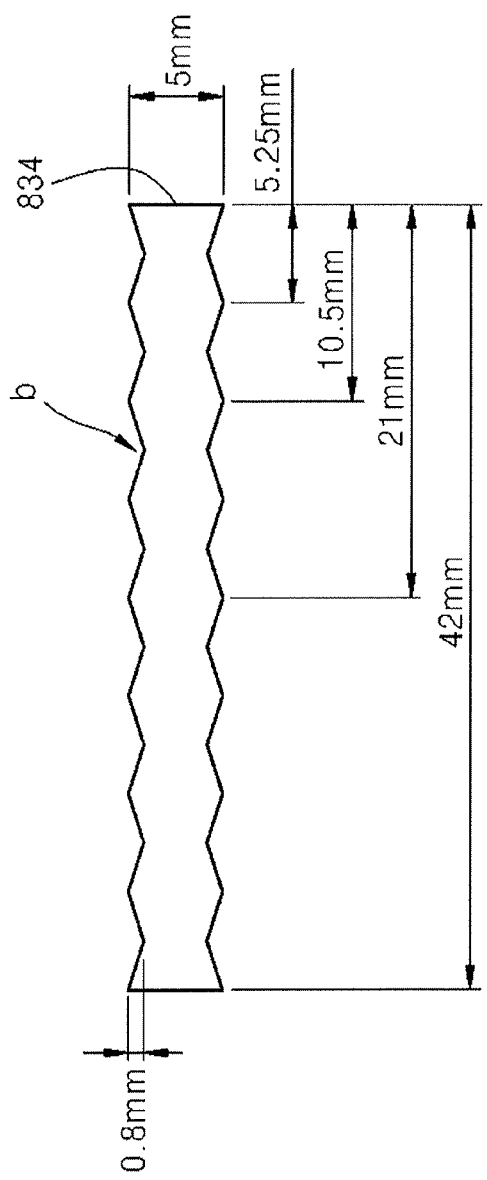
FIG. 15D illustrates a side view of the case of FIG. 15A.

FIG. 13A illustrates a schematic perspective view showing stress distribution when one bead b is formed on a case 634, according to another embodiment. FIG. 13B illustrates a schematic perspective view showing a displacement amount of the case 634 illustrated in FIG. 13A. FIG. 13C illustrates a front view of the case 634 of FIG. 13A. FIG. 14A illustrates a schematic perspective view showing stress distribution when two beads b are formed on a case 734, according to another embodiment. FIG. 14B illustrates a schematic perspective view showing a displacement amount of the case 734 of FIG. 14A. FIG. 14C illustrates a front view of the case 734 of FIG. 14A. FIG. 15A illustrates a schematic perspective view showing stress distribution when eight beads b are formed on four sides of a case 834, according to another embodiment. FIG. 15B illustrates a schematic perspective view showing a displacement amount of the case 834 of FIG. 15A. FIG. 15C illustrates a front view of the case 834 of FIG. 15A. FIG. 15D is a side view of the case 834 illustrated in FIG. 15A.

Table 3 shows parameters for simulations of the embodiments of FIGS. 13A through 13C, 14A through 14C, and 15A through 15D. Here, the case of FIGS. 8A through 8C uses the rectangular case 34 on which the beads b are not formed and, in Table 3, the embodiments of FIGS. 13A through 13C, 14A through 14C, and 15A through 15D are compared to that of FIGS. 8A through 8C with respect to variation in displacement amount.

TABLE 3

|  | FIGS. 8A through 8C | FIGS. 13A through 13C | FIGS. 14A through 14C | FIGS. 15A through 15D |
|---|---|---|---|---|
| Length of Side (A) | 34 | 34 | 34 | 34 |
| Number of Beads (N) of Side A | 0 | 1 | 2 | 8 |
| Peak Height of Bead (h) of Side A (mm) | 0 | 0.8 | 0.8 | 0.8 |
| Width of Bead (w) of Side A (mm) | 34 | 34 | 17 | 4.25 |
| $\frac{h}{w} \times 100$ of Side A | 0% | 2.6% | 4.7% | 18.8% |
| $\frac{N}{A(mm)} \times 100$ of Side A | 0% | 2.9% | 5.9% | 23.5% |
| Length of Side (B) (mm) | 42 | 42 | 42 | 42 |
| Number of Beads (N) of Side B | 0 | 0 | 0 | 8 |
| Peak Height of Bead (h) of Side B (mm) | 0 | 0 | 0 | 0.8 |
| Width of Bead (w) of Side B (mm) | 42 | 42 | 42 | 5.25 |
| $\frac{h}{w} \times 100$ of Side B | 0% | 0% | 0% | 15.2% |
| $\frac{N}{B(mm)} \times 100$ of Side B | 0% | 0% | 0% | 19% |
| Displacement Amount (mm) | 2.9 | 2.8 | 2.5 | 2.1 |
| Displacement Amount Reduction (%) | — | 5% | 13% | 27% |

As shown in Table 3, in comparison to the case of FIGS. 8A through 8C, the displacement amount is reduced by about 5% in the embodiment of FIGS. 13A through 13C, is reduced by about 13% in the embodiment of FIGS. 14A through 14C, and is reduced by about 27% in the embodiment of FIGS. 15A through 15D. Thus, according to Table 3, as the number N of the beads b increases, and as the ratio of the peak height h to the width $$w\left(\frac{h}{w} \times 100\right)$$

of the beads b increases, there is a greater reduction in the amount of displacement. In this case, the ratio of the peak height h to the width $$w\left(\frac{h}{w} \times 100\right)$$

of the beads b may be about 0% to about 50%, and more particularly, about 2% to about 33%. In Table 3, the ratio of the peak height h to the width $$w\left(\frac{h}{w} \times 100\right)$$

of the beads b is from about 2.6% to about 18.8%, which is included in the range of about 2% to about 33%.

The number N of the beads b with respect to one side having a length may be determined by using two methods described below. First, the number N of the beads b may be determined in a range from about 1 to about 10, regardless of the length of one side. In this case, the beads b may have a shape that satisfies the ratio of the peak height h to the width $$w\left(\frac{h}{w} \times 100\right)$$

of the beads, which is indicated in Table 1. Second, the number N of the beads b may be determined as an integer close to a value obtained by multiplying the length A of one side by a ratio of the number N of the beads b to a length of one side $$\left(\frac{N}{A(mm)} \times 100\right).$$

In this case, referring to Table 1, the ratio of the number N of the beads b to the length A of one side $$\left(\frac{N}{A(mm)} \times 100\right)$$

may be in a range from about 2% to about 24%.

As described above, a case configured to efficiently distribute internal pressure of, and increase rigidity of, a secondary battery according to embodiments may be formed by forming beads b by controlling locations, a width w, a peak height h, an angle θ, a curvature r, the number N, and a ratio of the peak height h to the width $$w\left(\frac{h}{w} \times 100\right)$$

of the beads b.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
a case, the case including a first side having a center and having a plurality of bendable beads on the first side, the beads in an original state having a peak height h and a width w, a ratio of the peak height h to the width w of each bead satisfying $$2\% \leq \left(\frac{h}{w} \times 100\right) \leq 50\%,$$

h and w being in a same unit of measure; and
an electrode assembly in the case, the electrode assembly including a first electrode, a second electrode, and a separator disposed between the first and second electrodes, each bead in the original state protruding in an inward direction toward the electrode assembly, wherein:
the plurality of beads includes a bead that is a closed curve and encircles the center of the first side.

2. The secondary battery as claimed in claim 1, wherein the ratio of the peak height h to the width w satisfies $$2\% \leq \left(\frac{h}{w} \times 100\right) \leq 33\%.$$

3. The secondary battery as claimed in claim 2, wherein the ratio of the peak height h to the width w satisfies $$2.6\% \leq \left(\frac{h}{w} \times 100\right) \leq 18.8\%.$$

4. The secondary battery as claimed in claim 1, wherein:
the plurality of beads includes N beads on the first side, N being more than one,
the first side has a first length A, A being in millimeters, the N beads extending orthogonal to the first length A, and
a ratio of N to the first length A satisfies $$2\% \leq \left(\frac{N}{A(mm)} \times 100\right) \leq 24\%.$$

5. The secondary battery as claimed in claim 4, wherein:
each of the N beads is a linear bead and is a member of a first set of linear beads,
the plurality of beads includes N' beads on the first side, N' being one or more, such that the first side also has a second set of the N' beads, the N' beads of the second set being orthogonal to the beads of the first set,
the first side has a second length B, B being in millimeters, the N' beads extending orthogonal to the second length B, and
a ratio of N' to the second length B satisfies $$2\% \leq \left(\frac{N'}{B(mm)} \times 100\right) \leq 24\%.$$

6. The secondary battery as claimed in claim 1, wherein the plurality of beads is disposed between opposing edges of the first side and the center of the first side, the beads being symmetric about an imaginary line orthogonal to the opposing edges and intersecting the center.

7. The secondary battery as claimed in claim 6, wherein the beads convolute the case so as to increase a surface area of the case.

8. The secondary battery as claimed in claim 1, wherein the beads are configured to be bendable from the original state to a modified state according to an increase in internal pressure inside the case such that a portion of each bead has a first distance and a second distance from the electrode assembly in the original state and the modified state, respectively, the second distance being greater than the first distance.

9. A secondary battery, comprising:
a case, the case including a first side having a plurality of bendable beads thereon, the first side having a center and having a first edge and a second edge opposite the first edge; and
an electrode assembly in the case, the electrode assembly including a first electrode, a second electrode, and a separator disposed between the first and second electrodes, each bead in an original state having a peak height h and a width w, a ratio of the peak height h to the width w of each bead satisfying $$2\% \leq \left(\frac{h}{w} \times 100\right) \leq 50\%,$$

h and w being in a same unit of measure, and each bead in the original state protruding in an inward direction toward the electrode assembly, wherein:
the first side has the plurality of beads disposed thereon symmetrically with respect to an imaginary line orthogonal to the first edge and the second edge, the imaginary line intersecting centers of the first and second edges, and
the plurality of beads includes a bead that is a closed curve and encircles the center of the first side.

10. The secondary battery as claimed in claim 9, wherein the plurality of beads includes a first linear bead extending between the first and second edges.

11. The secondary battery as claimed in claim 10, wherein the plurality of beads further includes a second linear bead extending orthogonal to the first linear bead.

12. The secondary battery as claimed in claim 9, wherein the plurality of beads further includes at least one additional bead encircling and concentric with the bead that is a closed curve and encircles the center of the first side.

13. The secondary battery as claimed in claim 9, wherein the plurality of beads further includes at least two discontinuous bead sections disposed symmetrically with respect to the center of the first side, the discontinuous bead sections being disposed outside the bead that is a closed curve and encircles the center of the first side such that the bead that is a closed curve and encircles the center of the first side is between the center of the first side and the discontinuous bead sections.

14. The secondary battery as claimed in claim 9, wherein the beads are configured to be bendable from the original state to a modified state according to an increase in internal pressure inside the case such that a portion of each bead has a first distance and a second distance from the electrode assembly in the original state and the modified state, respectively, the second distance being greater than the first distance.

15. A method of forming a secondary battery, the method comprising:
providing a case, the case including a first side having a center and having a plurality of bendable beads on the first side, each bead in an original state having a peak height h and a width w, a ratio of the peak height h to the width w of each bead satisfying $$2\% \leq \left(\frac{h}{w} \times 100\right) \leq 50\%,$$

h and w being in a same unit of measure, wherein the plurality of beads includes a bead that is a closed curve and encircles the center of the first side; and
disposing an electrode assembly in the case, the electrode assembly including a first electrode, a second electrode, and a separator disposed between the first and second electrodes, each bead in the original state protruding in an inward direction toward the electrode assembly.

16. The method as claimed in claim 15, wherein the beads are formed to be bendable from the original state to a modified state according to an increase in internal pressure inside the case such that a portion of each bead has a first distance and a second distance from the electrode assembly in the original state and the modified state, respectively, the second distance being greater than the first distance.

* * * * *